Oct. 27, 1936. G. W. LUNDHOLM Re. 20,144
MINIATURE UPRIGHT PIANO
Original Filed June 8, 1932
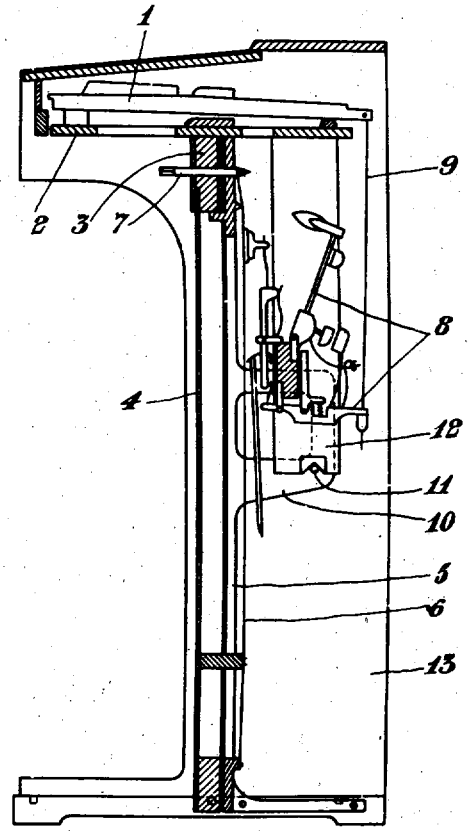
Inventor
Gustaf Waldemar Lundholm
by Williams, Rich & Morse
Attorneys Reissued Oct. 27, 1936

Re. 20,144

UNITED STATES PATENT OFFICE 20,144

MINIATURE UPRIGHT PIANO

Gustaf Waldemar Lundholm, Stockholm, Sweden, assignor to W. G. Eavestaff & Sons Limited, London, England Original No. 1,968,695, dated July 31, 1934, Serial No. 616,054, June 8, 1932. Application for reissue July 7, 1936, Serial No. 89,374. In Sweden June 16, 1931

3 Claims. (Cl. 84—174)

The present invention relates to an improvement in miniature upright pianos. This type of piano is characterized by the facts that its total height is about that of the height of a normal keyboard and that the piano action or hammer mechanism is below the level of the keyboard, the hammers striking the strings near their upper ends. As is usual in piano construction, the strings are strung on a metal frame with which are associated a sound board and a wrest plank carrying the tuning pegs. In instruments of this kind as hitherto constructed the action is carried by the side walls of the piano case. This arrangement has the disadvantage, however, that if the side walls warp, as might easily happen, the action and hammer mechanism is displaced from its proper position with relation to the strings.

The present invention has primarily for its purpose to obviate this disadvantage, and it consists principally in that the metal frame is provided with outwardly projecting brackets or arms which serve to support the piano action which may thus be mounted in place independently of the side walls of the piano case. In this way it is ensured that the action is always retained in correct position relatively to the strings, which are also carried by the metal frame. From the point of view of manufacture it is also a great advantage that the entire instrument can be assembled before the side walls are fixed to the same. The brackets may suitably be provided with pivots or the like on which the mechanism is pivoted so that it may be swung outwardly from the metal frame thus permitting access to the hammers for the purpose of facilitating intonation of the piano.

A constructional form of the invention is illustrated by way of example in the accompanying drawing which shows a vertical section of a miniature piano embodying the invention.

Referring to the drawing, 1 denotes the keyboard, and 2 denotes the keyboard bottom which is fixed by means of screws direct to the wrest plank 3. 4 denotes the soundboard which forms simultaneously the front wall of the piano, 5 denotes the metal frame of iron, 6 the strings and 7 the tuning pegs which serve for tuning the strings, and which traverse the wrest plank 3 so that the tuning key can be applied to their forward or left-hand ends as viewed in the drawing, in order to facilitate the tuning. The piano action or hammer mechanism indicated generally at 8, which is of the usual construction, is positioned adjacent the iron frame 5, below the keyboard and is actuated by the keys of the latter in a well known manner by means of metal wires 9 or other suitable connecting members. According to the invention the frame 5 is provided with two outwardly projecting brackets 10, one at each side, said brackets being provided with pivots 11 on which the frame 12 supporting the mechanism of the action is pivoted. By this arrangement the entire action may be swung outwardly from the frame 5, to the right in the drawing, on the pivots 11 when the piano is to be intoned so that this work is considerably facilitated. The provision of the brackets 10 for supporting ths action ensures that the action is retained in its correct position relatively to the strings 6, and enables the entire instrument to be assembled and intoned before the side walls 13 are affixed.

The constructional form above described and illustrated in the drawing is only to be regarded as an example and may, of course, be modified in several respects as regards its details without departing from the principle of the invention. For instance, instead of making the brackets 10 integral with the frame 5, they may be made as separate pieces and may be secured to the frame by means of screws or the like.

I claim:

1. In a miniature upright piano, in combination, a vertical metal string frame, a keyboard adjacent the top of said frame, a piano action assembled as a unitary structure including a pair of end supports, a pair of outwardly extending brackets on said string frame, the said supports being secured to said brackets to maintain the action in operative relation to the strings below the level of the keyboard.

2. In a miniature upright piano, in combination, a vertical metal string frame, a keyboard adjacent the top of said frame, a piano action assembled as a unitary structure including a pair of end supports, a pair of outwardly extending brackets on said string frame, the said supports being pivotally secured to said brackets to maintain the action in operative relation to the strings below the level of the keyboard.

3. A miniature piano of the character described, having the action below the level of the keyboard, comprising an upright metal string frame, strings attached to said frame, a piano action assembled as a unitary structure including a pair of end supports, a pair of outwardly extending brackets at the sides of said frame, the said supports being secured to said brackets to maintain the action in operative relation to the strings.

GUSTAF WALDEMAR LUNDHOLM.